US009171466B2

(12) United States Patent
Sumizawa

(10) Patent No.: US 9,171,466 B2
(45) **Date of Patent: *Oct. 27, 2015**

(54) ON-VEHICLE INFORMATION TERMINAL AND INFORMATION DISTRIBUTION SYSTEM

(75) Inventor: Akio Sumizawa, Sagamihara (JP)

(73) Assignee: Clarion Co., Ltd., Tokyo (JP)

( * ) Notice: Subject to any disclaimer, the term of this patent is extended or adjusted under 35 U.S.C. 154(b) by 1277 days.

This patent is subject to a terminal disclaimer.

(21) Appl. No.: 12/881,551

(22) Filed: Sep. 14, 2010

(65) Prior Publication Data

US 2011/0066315 A1 Mar. 17, 2011

(30) Foreign Application Priority Data

Sep. 15, 2009 (JP) ................................ 2009-213053

(51) Int. Cl.
*G06F 7/00* (2006.01)
*G08G 1/0967* (2006.01)

(52) U.S. Cl.
CPC ................................ *G08G 1/09675* (2013.01)

(58) Field of Classification Search
CPC .......... G08G 1/0104; G08G 1/069716; G08G 1/096775; G08G 1/096741
USPC ........... 701/1, 2, 24, 25, 300, 301, 31.4, 61.5, 701/36, 414, 420, 428, 45, 467, 469, 48, 701/515
See application file for complete search history.

(56) References Cited

U.S. PATENT DOCUMENTS 7,440,843 B2 10/2008 Yoshikawa et al.
7,680,589 B2 3/2010 Yamada
8,315,784 B2 11/2012 Endo et al.
2002/0106987 A1 8/2002 Linden
2004/0009766 A1 1/2004 Hong
2004/0010366 A1* 1/2004 Videtich ........................ 701/210
2005/0231394 A1 10/2005 Machii et al.
2007/0198184 A1 8/2007 Yoshioka et al.
2008/0120030 A1 5/2008 Yamada
2008/0275637 A1* 11/2008 Kim et al. ..................... 701/201

(Continued)

FOREIGN PATENT DOCUMENTS

CN 1577321 A 2/2005
CN 101111741 A 1/2008

(Continued)

OTHER PUBLICATIONS

Extended European Search Report dated Feb. 3, 2011 (seven (7) pages).
Chinese Office Action dated Jan. 4, 2013 including English translation (Twenty-two (22) pages).
Japanese Office Action with English translation dated Sep. 24, 2013 (seven (7) pages).

*Primary Examiner* — Ian Jen
(74) *Attorney, Agent, or Firm* — Crowell & Moring LLP

(57) ABSTRACT

An on-vehicle information terminal includes a traffic information obtaining unit that obtains traffic information through wireless communication, a telematics information obtaining unit that obtains telematics information provided from a distribution server via a mobile communication network, a selection unit that selects either the traffic information or the telematics information when contents of the traffic information and contents of the telematics information are different, and a traffic condition indicating unit that indicates road traffic conditions based upon either the traffic information or the telematics information having been selected by the selection unit.

12 Claims, 9 Drawing Sheets

(56) References Cited

U.S. PATENT DOCUMENTS

| | | | | |
|---|---|---|---|---|
| 2009/0228207 | A1* | 9/2009 | Sasano | 701/210 |
| 2010/0228404 | A1* | 9/2010 | Link et al. | 701/1 |
| 2011/0066315 | A1* | 3/2011 | Sumizawa | 701/29 |
| 2013/0054134 | A1* | 2/2013 | Wang et al. | 701/424 |
| 2013/0131921 | A1* | 5/2013 | Uhlmann et al. | 701/36 |

FOREIGN PATENT DOCUMENTS

| | | | |
|---|---|---|---|
| CN | 101187565 | A | 5/2008 |
| JP | 2001-116568 | A | 4/2001 |
| JP | 2005-241313 | A | 9/2005 |
| JP | 2007-80030 | A | 3/2007 |

* cited by examiner

ON-VEHICLE INFORMATION TERMINAL AND INFORMATION DISTRIBUTION SYSTEM

INCORPORATION BY REFERENCE

The disclosure of the following priority application is herein incorporated by reference: Japanese Patent Application No. 2009-213053 filed Sep. 15, 2009.

BACKGROUND OF THE INVENTION

1. Field of the Invention

The present invention relates to an on-vehicle information terminal and an information distribution system for vehicles.

2. Description of Related Art

The applicant of the present invention previously submitted a patent application for a road traffic information distribution system through which road traffic information distributed through FM multiplex broadcasting or the like is received by an on-vehicle unit and also road traffic information for a specified target area to which a specific road traffic condition applies, is distributed to the on-vehicle unit from a distribution server via a mobile communication network such as a portable telephone network (see Japanese Laid Open Patent Publication No. 2007-80030).

In the event that the contents of traffic information received through FM multiplex broadcasting and the contents of traffic information distributed from the distribution server are different, there is no way of ascertaining which traffic information should take precedence in the road traffic information distribution system described above.

SUMMARY OF THE INVENTION

An on-vehicle information terminal according to a 1st aspect of the present invention comprises: a traffic information obtaining unit that obtains traffic information through wireless communication; a telematics information obtaining unit that obtains telematics information provided from a distribution server via a mobile communication network; a selection unit that selects either the traffic information or the telematics information when contents of the traffic information and contents of the telematics information are different; and a traffic condition indicating unit that indicates road traffic conditions based upon either the traffic information or the telematics information having been selected by the selection unit.

According to a 2nd aspect of the present invention, the on-vehicle information terminal of the 1st aspect may further comprise a decision-making unit that makes a decision, based upon collection time information included in the telematics information, as to whether or not a predetermined valid period for the telematics information is yet to expire. In this on-vehicle information terminal, the selection unit can select either the traffic information or the telematics information based upon decision-making results by the decision-making unit.

According to a 3rd aspect of the present invention, in the on-vehicle information terminal of the 2nd aspect, it is preferred that, if the decision-making unit decides that the valid period for the telematics information has expired, the selection unit selects the telematics information for a road segment for which corresponding telematics information is provided and no corresponding traffic information is provided, and selects the traffic information for other road segments.

According to a 4th aspect of the present invention, the on-vehicle information terminal of the 2nd or 3rd aspect may further comprise: a traveling road identifying unit that identifies a traveling road on which a subject vehicle is traveling; a speed detection unit that detects an actual traveling speed at which the subject vehicle is traveling; and a speed calculation unit that individually calculates, based upon the traffic information and the telematics information, estimated traveling speeds at which the subject vehicle would be expected to travel on the traveling road. In this on-vehicle information terminal, if the decision-making unit decides that the valid period for the telematics information is yet to expire, the selection unit can select either the traffic information or the telematics information in correspondence to which an estimated traveling speed with a smaller difference relative to the actual traveling speed has been calculated.

According to a 5th aspect of the present invention, the on-vehicle information terminal of the 2nd or 3rd aspect may further comprise an estimated arrival time calculation unit that individually calculates, based upon the traffic information and the telematics information, estimated arrival times at a destination set in advance. In this on-vehicle information terminal, if the decision-making unit decides that the valid period for the telematics information is yet to expire, the selection unit can select either the traffic information or the telematics information in correspondence to which a later estimated arrival time has been calculated.

According to a 6th aspect of the present invention, the on-vehicle information terminal of the 2nd or 3rd aspect may further comprise a reliability factor calculation unit that individually calculates reliability factors for the traffic information and the telematics information, in correspondence to lengths of time having elapsed since collection times thereof. In this on-vehicle information terminal. In this on-vehicle information terminal, if the decision-making unit decides that the valid period for the telematics information is yet to expire, the selection unit can select either the traffic information or the telematics information with a reliability factor thereof indicating a higher level of reliability.

According to a 7th aspect of the present invention, in the on-vehicle information terminal of the 6th aspect, it is desirable that the reliability factor calculation unit sets a decreasing rate, at which the reliability factor calculated for the traffic information decreases as time elapses, higher than a decreasing rate at which the reliability factor calculated for the telematics information decreases as time elapses.

According to an 8th aspect of the present invention, the on-vehicle information terminal of the 1st aspect may further comprise: a traveling road identifying unit that identifies a traveling road on which a subject vehicle is traveling; a speed detection unit that detects an actual traveling speed at which the subject vehicle is traveling; and a speed calculation unit that individually calculates, based upon the traffic information and the telematics information, estimated traveling speeds at which the subject vehicle would be expected to travel on the traveling road. In this on-vehicle information terminal, the selection unit can select either the traffic information or the telematics information in correspondence to which an estimated traveling speed with a smaller difference relative to the actual traveling speed has been calculated.

According to a 9th aspect of the present invention, the on-vehicle information terminal of the 1st aspect may further comprise an estimated arrival time calculation unit that individually calculates, based upon the traffic information and the telematics information, estimated arrival times at a destination set in advance. In this on-vehicle information terminal, the selection unit can select either the traffic information or the telematics information, in correspondence to which a later estimated arrival time has been calculated.

According to a 10th aspect of the present invention, the on-vehicle information terminal of the 1st aspect may further comprise a reliability factor calculation unit that individually calculates reliability factors for the traffic information and the telematics information, in correspondence to lengths of time having elapsed since collection times thereof. In this on-vehicle information terminal, the selection unit can select either the traffic information or the telematics information with a reliability factor thereof indicating a higher level of reliability.

According to an 11th aspect of the present invention, in the on-vehicle information terminal of the 10th aspect, it is desirable that the reliability factor calculation unit sets a decreasing rate, at which the reliability factor calculated for the traffic information decreases as time elapses, higher than a decreasing rate at which the reliability factor calculated for the telematics information decreases as time elapses.

An information distribution system according to a 12th aspect of the present invention comprises: an on-vehicle information terminal of any one of the 1st through 11th aspects; and a distribution server that provides the telematics information to the on-vehicle information terminal via the mobile communication network.

According to the present invention, the optimal traffic information can be selected if traffic information obtained through a plurality of methods is not identical.

DESCRIPTION OF PREFERRED EMBODIMENTS

First Embodiment

Figure 1:
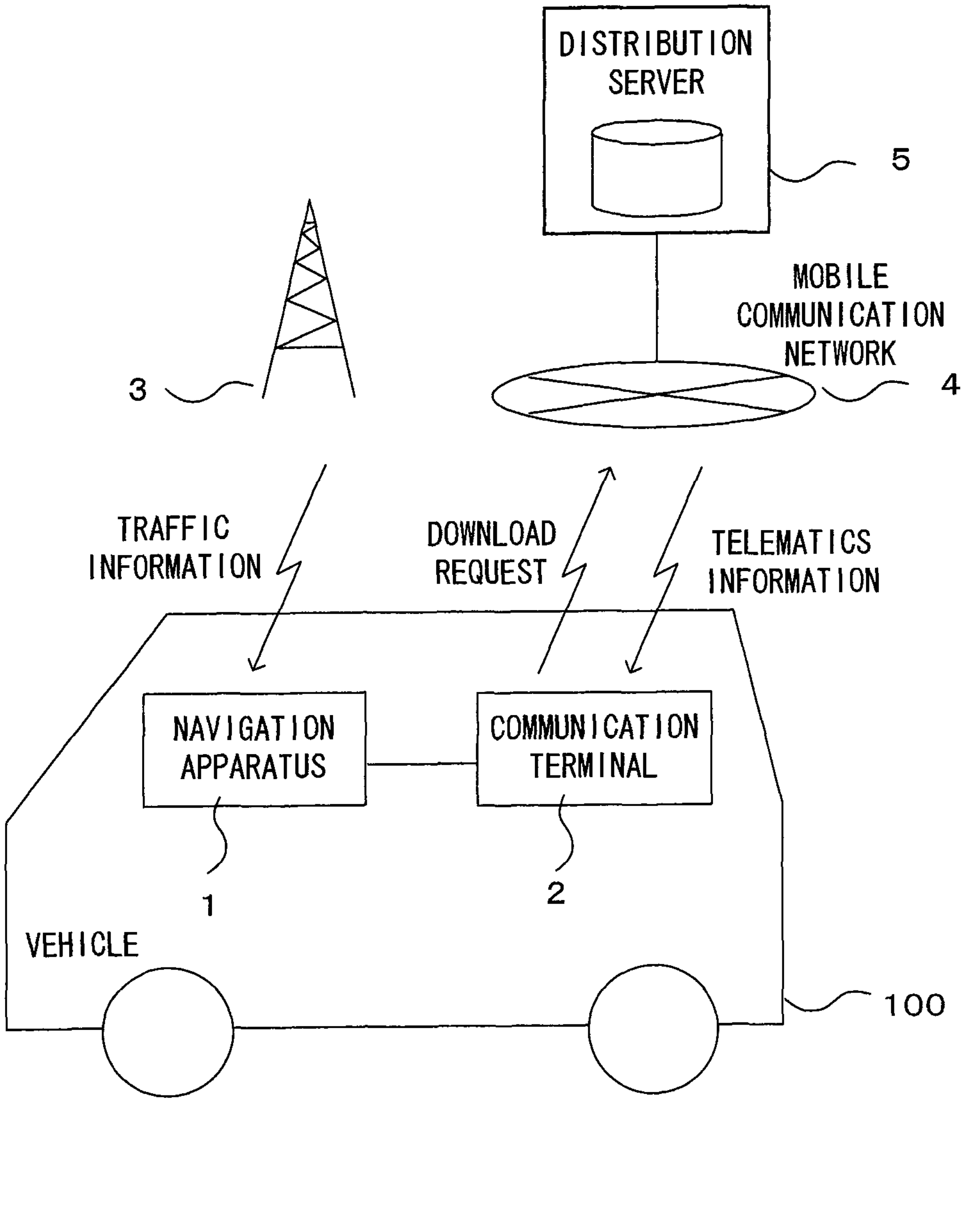
FIG. 1 shows the configuration of the information distribution system achieved in an embodiment of the present invention.

FIG. 1 shows the configuration of the information distribution system achieved in an embodiment of the present invention. The system comprises a navigation apparatus 1 and a communication terminal 2 both installed in a vehicle 100, a broadcasting facility 3 from which FM multiplex broadcast is provided, a mobile communication network 4 and a distribution server 5.

The navigation apparatus 1 guides the vehicle 100 to a destination having been set by bringing up a map on display based upon map data and searching for a recommended route to the destination. In addition, the navigation apparatus 1 receives traffic information transmitted through FM multiplex broadcasting from a traffic information distribution center (not shown) via the broadcasting facility 3. The types of information distributed as traffic information include weather information indicating the current weather or providing a weather forecast and event information on various types of events (e.g., festivals, street markets and sports events) that may affect road traffic conditions, in addition to congestion information reporting road congestion conditions or traffic control conditions.

The systems through which traffic information such as that described above is distributed in the known art include the VICS (Vehicle Information and Communication System) operating in Japan and the RDS-TMC (Radio Data System-Traffic Message Channel) operating in Europe. It is to be noted that while the traffic information is transmitted to the navigation apparatus 1 through FM multiplex broadcasting in the embodiment, the traffic information may be transmitted through an alternative method. For instance, the traffic information may be transmitted from roadside beacons or it may be transmitted through satellite broadcasting.

The navigation apparatus 1 issues a download request to the distribution server 5 so as to download telematics information corresponding to the current position of the vehicle 100 and the route along which it is traveling. In response to the download request, the distribution server 5 distributes telematics information to the navigation apparatus 1. The telematics information distributed from the distribution server 5 includes congestion information covering more roads than those covered in the congestion information included in the traffic information described earlier. Namely, as the distribution server 5 distributes the telematics information, the navigation apparatus 1 is able to obtain additional congestion information that is not provided in the traffic information. The telematics information provided by the distribution server 5 is received at the navigation apparatus 1 via the mobile communication network 4 and the communication terminal 2. The navigation apparatus 1 is thus able to download the telematics information originating from the distribution server 5.

The communication terminal 2 is connected to the navigation apparatus 1. Under control executed by the navigation apparatus 1, the communication terminal 2 is wirelessly connected with the mobile communication network 4. The distribution server 5 is connected to the mobile communication network 4. In other words, the navigation apparatus 1 is connected to the distribution server 5 via the communication terminal 2 and the mobile communication network 4.

It is to be noted that the wireless connection between the communication terminal 2 and the mobile communication network 4 is achieved via a wireless base station (not shown). Such wireless base stations, each capable of wirelessly communicating with communication terminals 2 currently located within a specific communication area surrounding the particular wireless base station, are in place at numerous points throughout the country. In addition, the navigation apparatus 1 and the communication terminal 2 may be connected through wireless communication such as infrared communication or Bluetooth instead of through a wired connection via a cable or the like. The communication terminal 2 may be, for instance, a portable telephone.

At the distribution server 5, congestion information related to roads in various regions is collected and stored and the contents of the stored congestion information are updated over predetermined time intervals. Based upon the congestion information, the distribution server 5 distributes the telematics information to the navigation apparatus 1. It is to be noted that as explained earlier, the congestion information provided as telematics information covers more roads than the congestion information included in the traffic information. This means that the distribution server 5 must collect congestion information for more roads than does the traffic information distribution center. For instance, congestion information originating from another information provider may be provided to the distribution server 5 in addition to the congestion information from the traffic information distribution center. As an alternative, the distribution server 5 may collect congestion information provided as probe data from vehicles traveling at various locations.

Figure 2:
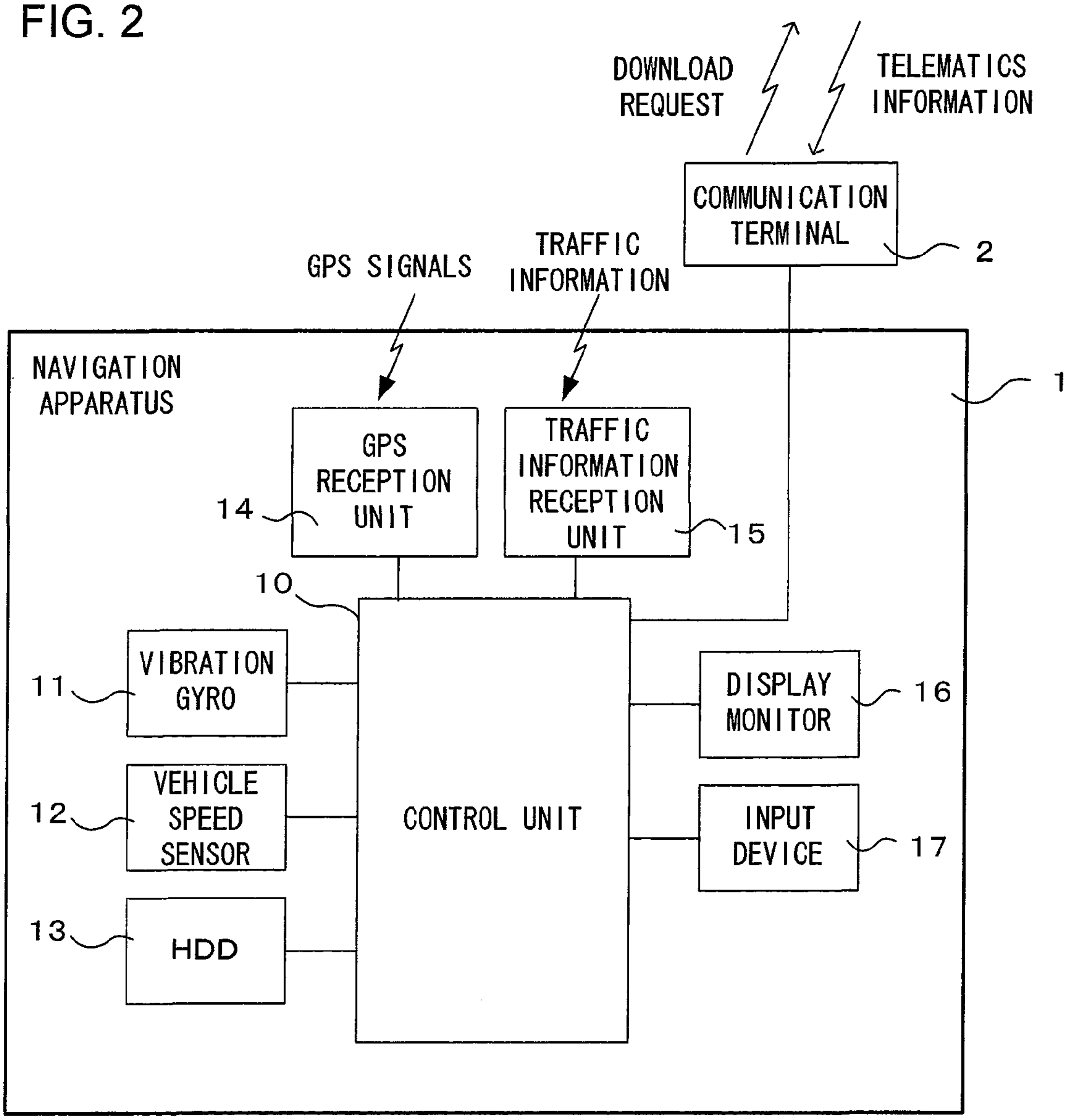
FIG. 2 is a block diagram showing the structure of the navigation apparatus.

The structure of the navigation apparatus 1 is illustrated in the block diagram in FIG. 2. The navigation apparatus 1 comprises a control unit 10, a vibration gyro 11, a vehicle speed sensor 12, a hard disk (HDD) 13, a GPS (global positioning system) reception unit 14, a traffic information reception unit 15, a display monitor 16 and an input device 17.

The control unit 10, constituted with a microprocessor, various peripheral circuits, a RAM, a ROM and the like, executes various types of processing to be described later based upon a control program and map data recorded in the HDD 13. The communication terminal 2 is connected to the control unit 10, and as the control unit 10 controls the communication terminal 2, the navigation apparatus 1 is able to send a download request to the distribution server 5 in FIG. 1. The telematics information distributed from the distribution server 5 in response to this download request is received at the communication terminal 2, which then outputs the received information to the control unit 10.

The vibration gyro 11 is a sensor that detects the angular speed of the subject vehicle. The vehicle speed sensor 12 detects the speed of the subject vehicle. As the subject vehicle motion is detected over predetermined time intervals via the sensors, the control unit 10 is able to determine the extent of subject vehicle positional displacement and based upon the extent of the subject vehicle positional displacement thus determined, the current position of the subject vehicle, i.e., the current location, is detected.

In the HDD 13, which is a non-volatile recording medium, various types of data including map data are recorded. The data recorded in the HDD 13 are read out as necessary under control executed by the control unit 10 and the data having been read out are utilized in various types of processing or control executed by the control unit 10.

It is to be noted that the map data recorded in the HDD 13 include route calculation data, route guidance data, road data and background data. The route calculation data are used when searching for the optimal route to a destination. The route guidance data, which are used to guide the subject vehicle to the destination through the route having been determined, indicate intersection names, road names and the like. The road data indicate road shapes and road categories. The background data indicate the shapes of geographical entities other than roads, such as rivers and railways, the positions of various facilities and the like. It is to be noted that the term “link” is used to refer to the minimum unit representing a road in the map data. In other words, each road in the map data is constituted with a plurality of links.

The GPS reception unit 14 receives a GPS signal transmitted from a GPS satellite and outputs the received GPS signal to the control unit 10. The GPS signal contains information indicating the location of the transmitting GPS satellite and the transmission time of the GPS signal, which can be used to determine the subject vehicle position and the current time. In other words, based upon such information contained in GPS signals received from at least a predetermined minimum number of GPS satellites, the current position of the subject vehicle and the current time can be calculated.

The traffic information reception unit 15 receives the traffic information transmitted through FM multiplex broadcasting from the traffic information distribution center via the broadcasting facility 3. The traffic information having been received at the traffic information reception unit 15 is then output to the control unit 10. The control unit 10 makes a decision as to whether or not to download telematics information by executing processing based upon the traffic information as detailed later and issues a download request to the distribution server 5 upon deciding that the telematics information is to be downloaded.

The display monitor 16, at which various images or video images are displayed, may be a liquid crystal display unit. A map of the area around the current subject vehicle position and the like are brought up on display at the display monitor 16. It is to be noted that the display monitor 16 should be installed at a position at which it can be viewed with ease by the driver, e.g., on the dashboard or in the instrument panel of the subject vehicle.

The input device 17 is a user interface via which the user performs various input operations to engage the navigation apparatus 1 in operation and includes various types of input switches. The user operates the input device 17 to enter the name of the facility or geographical point he wishes to set as the destination, to select a destination among preregistered locations or scroll the map along a desired direction. The input device 17 may be an operation panel or a remote control unit. As an alternative, the input device 17 and the display monitor 16 may be integrated into a single touch panel unit.

Once the user has set a specific destination by operating the input device 17, the navigation apparatus 1 searches for a route from the current position to the destination by designating the current position having been detected, as described above, as a route search start point and executing an arithmetic operation with a specific algorithm based upon the route calculation data included in the map data. The recommended route resulting from the route search is indicated on the map in a format distinguishable from other roads by, for instance, using a different display color. The navigation apparatus 1 guides the subject vehicle to the destination along the recommended route.

Figure 3:
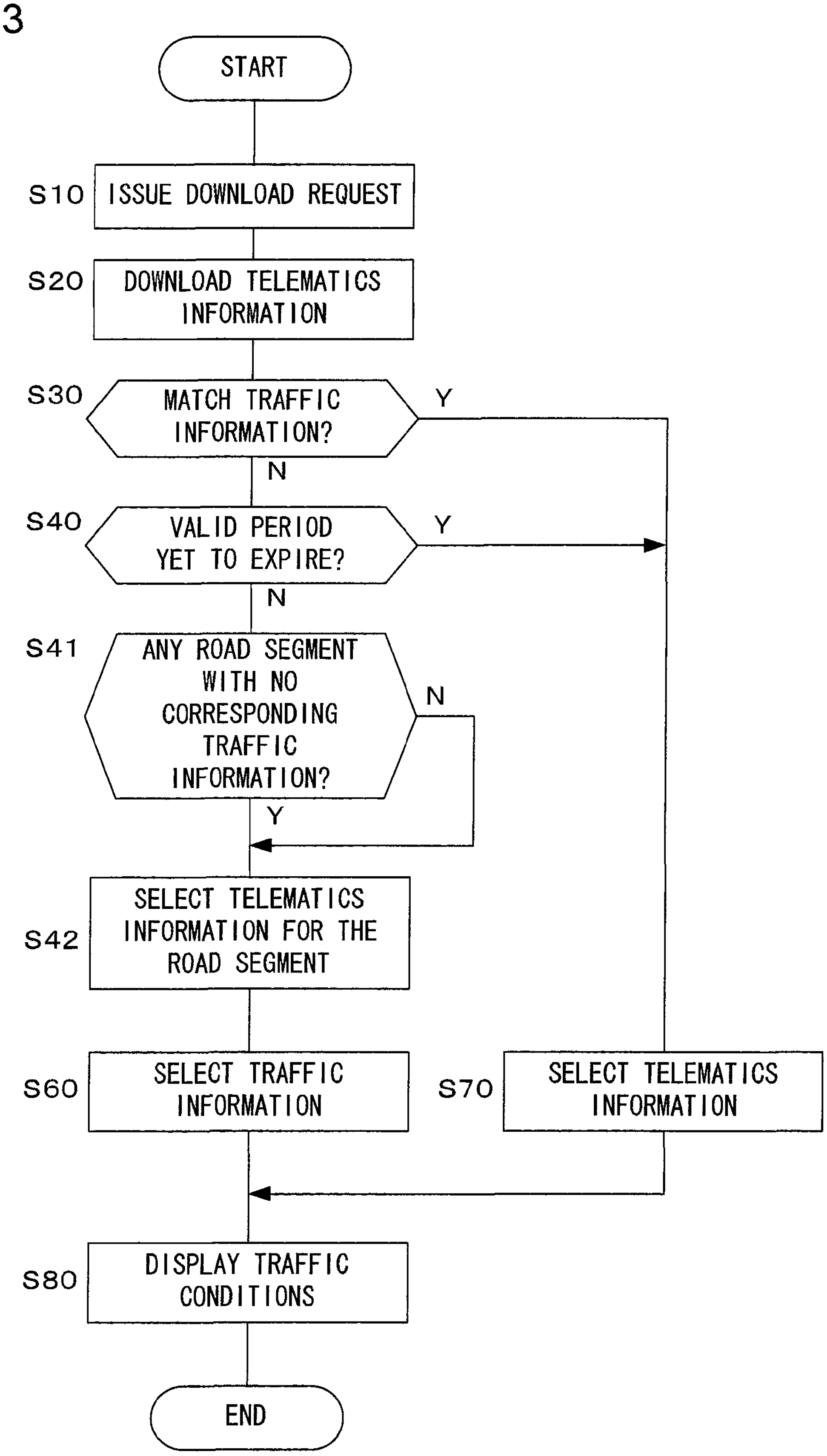
FIG. 3 presents a flowchart of the processing executed in the navigation apparatus in a first embodiment of the present invention.

Next, the processing executed in the navigation apparatus 1 when downloading telematics information provided by the distribution server 5 is described in reference to the flowchart presented in FIG. 3. The processing in this flowchart is executed by the control unit 10 at the navigation apparatus 1 when a specific download start condition is satisfied. For instance, the processing in the flowchart in FIG. 3 may be executed in response to a specific operation performed by the user via the input device 17 or over predetermined time intervals.

In step S10, the control unit 10 transmits, via the communication terminal 2, a telematics information download request to the distribution server 5 by controlling the communication terminal 2. In response to the download request, the distribution server 5 transmits telematics information to the communication terminal 2 via the mobile communication network 4, and the telematics information received at the communication terminal 2 is then output to the control unit 10. In this processing, a telematics information download target area may be indicated to the distribution server 5. For instance, an area ranging within a predetermined distance from the current position of the vehicle 100 may be designated as a download target area, or if a recommended route to a destination has been determined in the navigation apparatus 1, areas each ranging within a predetermined distance from the destination and from the recommended route may be designated as download target areas.

In step S20, the control unit 10 downloads the telematics information transmitted from the distribution server 5 in response to the download request issued in step S10. It is to be noted that the downloaded telematics information may be output from the control unit 10 to the HDD 13 and be recorded in the HDD 13.

In step S30, the control unit 10 makes a decision as to whether or not the contents of the telematics information downloaded in step S20 match the contents of the traffic information received at the traffic information reception unit 15. In this step, the decision is made by using the congestion information or the traffic control information related to common roads in the telematics information and the traffic information. If the contents of the telematics information and contents of the traffic information do match, the operation proceeds to step S70, whereas if they do not match, the operation proceeds to step S40. If traffic information has been received a plurality of times, it is desirable to make the decision by using the most recently received traffic information.

In step S40, the control unit 10 makes a decision as to whether or not the telematics information downloaded in step S20 is effective, with a predetermined valid period thereof yet to expire. If the telematics information is still valid, the operation proceeds to step S70, whereas if the valid period has expired, the operation proceeds to step S41. It is to be noted that the telematics information includes collection time information, i.e., information indicating the time at which the particular telematics information was collected at the distribution server 5 so as to enable the decision-making in step S40. Based upon the collection time information, the control unit 10 calculates the length of time having elapsed between the telematics information collection time and the current time, and makes a decision in step S40 by determining whether or not the length of elapsed time exceeds the predetermined valid period, e.g., one hour.

In step S41, the control unit 10 makes a decision as to whether or not there is any road segment with no corresponding traffic information, among the road segments to which the telematics information downloaded in step S20 corresponds. If there is any road segment with no corresponding traffic information, i.e., if there is a road segment in correspondence to which no traffic information has been provided, among the road segments for which congestion information or traffic control information has been provided in the telematics information, the operation proceeds to step S42. However, if there is no road segment without corresponding traffic information, i.e., if traffic information has been provided in correspondence to all the road segments for which congestion information or traffic control information has been provided in the telematics information, the operation proceeds to step S60.

In step S42, the control unit 10 selects the telematics information downloaded in step S20 for the road segment determined in step S41 to have corresponding telematics information and have no corresponding traffic information. Through these measures, even when the validity of the downloaded telematics information has expired, the telematics information will still be selected for the road segment with no corresponding traffic information. Once step S42 has been executed, the operation proceeds to step S60.

In step S60, the control unit 10 selects the traffic information having been received at the traffic information reception unit 15. At this time, if the telematics information has been selected for a road segment with no corresponding traffic information in step S42, the traffic information is selected for the remaining road segments. Once step S60 has been executed, the operation proceeds to step S80.

In step S70, the control unit 10 selects the telematics information downloaded in step S20. Namely, if it is decided in step S30 that the contents of the downloaded telematics information and the contents of the traffic information match or if it is decided in step S40 that the valid period for the telematics information is yet to expire, the telematics information is selected. It is to be noted that, if an affirmative decision is made in step S30, then the contents of the telematics information and the contents of the traffic information are identical, and accordingly, the traffic information, instead of the telematics information, may be selected in step S70. Once step S70 has been executed, the operation proceeds to step S80.

In step S80, the control unit 10 displays traffic conditions on the map based upon the traffic information selected in step S60 or the telematics information selected in step S70. As a result, the traffic conditions on the roads can be indicated to the user. It is to be noted that if the traffic information is selected in step S60 and the telematics information is selected for a road segment with no corresponding traffic information in step S42, the traffic conditions on this particular road segment will be displayed based upon the telematics information. In other words, the traffic information and the telematics information are combined so as to display traffic conditions by supplementing information for any road segment for which no traffic information has been provided, with the telematics information. Upon executing step S80, the control unit 10 ends the processing in the flowchart presented in FIG. 3.

The following advantages are achieved through the first embodiment described above.

(1) The navigation apparatus 1 obtains traffic information at the traffic information reception unit 15 through wireless communication and also obtains telematics information provided from the distribution server 5 via the mobile communication network 4 through the processing executed by the control unit 10 (step S20). It then makes a decision (step S30) as to whether or not the contents of the traffic information and the contents of the telematics information match, and if they are determined to be different, either the traffic information or the telematics information is selected (step S60 or S70). Based upon the traffic information or the telematics information thus selected, road traffic conditions are indicated (step S80). Through these measures, if the contents of traffic information obtained through a plurality of methods do not match, i.e., if the contents of the traffic information obtained at the traffic information reception unit 15 and the contents of the telematics information downloaded from the distribution server 5 are different from each other, either information, whichever will be optimal, is selected.

(2) Based upon the collection time information included in the telematics information, the control unit 10 makes a decision as to whether or not a predetermined valid period for the telematics information is yet to expire (step S40). Based upon the results of this decision-making, the control unit 10 determines whether to execute step S60 or step S70 in order to select either the traffic information or the telematics information. Thus, either the traffic information or the telematics information, whichever will be optimal, can be selected based upon the telematics information valid period.

(3) If it is decided in step S40 that the validity of the telematics information has expired, the control unit 10 makes a decision (step S41) as to whether or not there is any road segment with no corresponding traffic information among the road segments in correspondence to which the telematics information has been provided. If it is decided that there is a road segment with corresponding telematics information, for which no corresponding traffic information has been provided, the telematics information is selected for the particular road segment (step S42) and the traffic information is selected for the remaining road segments (step S60). As a result, traffic conditions can be indicated by supplementing information for any road segment for which no traffic information has been provided, with the telematics information.

Second Embodiment

The second embodiment of the present invention is now described below. In the embodiment, if the contents of traffic information and the contents of telematics information obtained at the navigation apparatus are different, either the traffic information or the telematics information is selected through a method distinguishable from that adopted in the first embodiment described earlier. It is to be noted that since the configuration of the information distribution system and the structure of the navigation apparatus achieved in the embodiment are identical to those in FIGS. 1 and 2 in reference to which the first embodiment has been described, a repeated explanation thereof is omitted.

Figure 4:
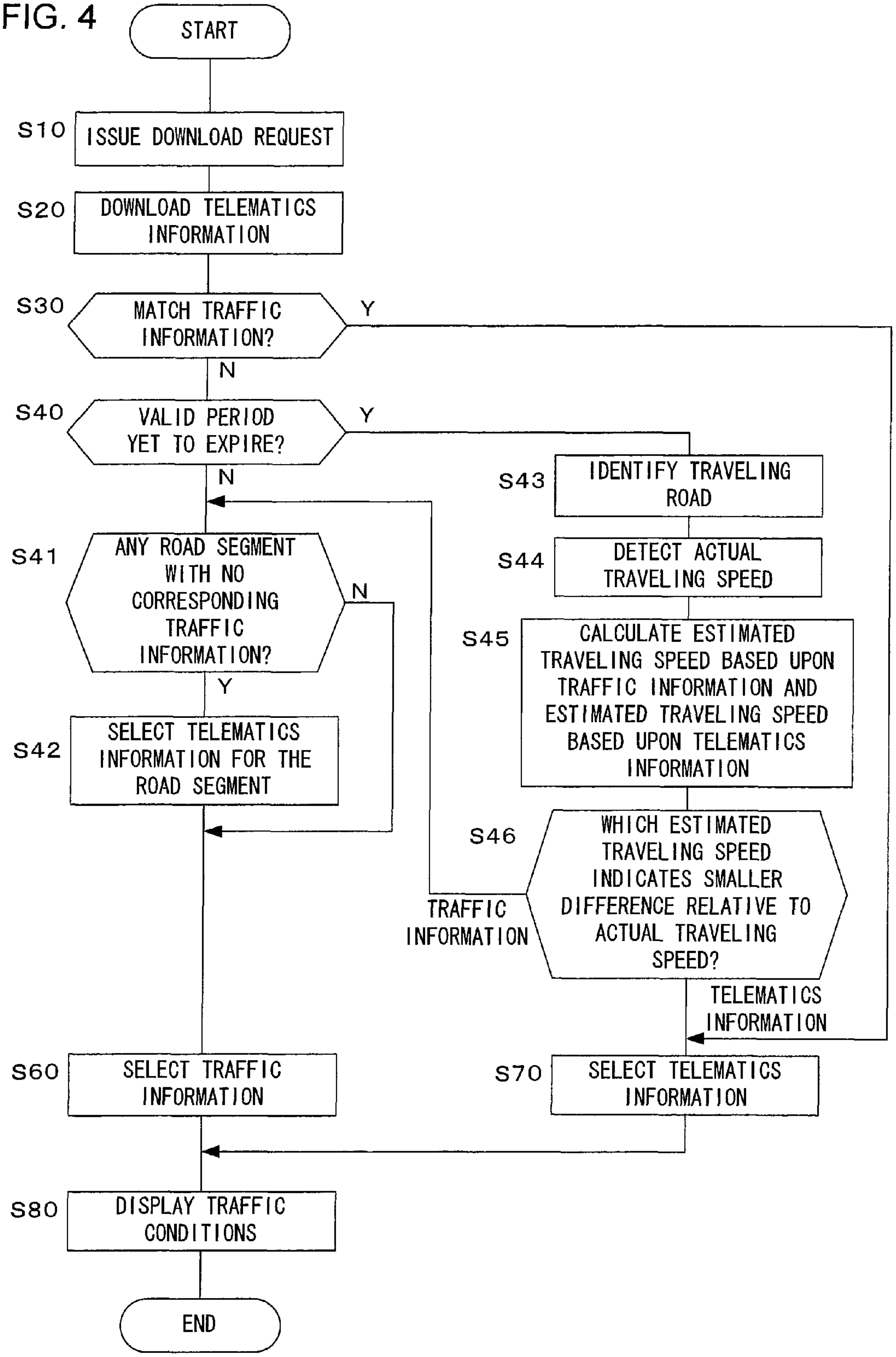
FIG. 4 presents a flowchart of the processing executed in the navigation apparatus in a second embodiment of the present invention.

The processing executed in the navigation apparatus 1 when downloading telematics information provided by the distribution server 5 in the embodiment is described in reference to the flowchart presented in FIG. 4. It is to be noted that the same step numbers are assigned to steps in the flowchart in FIG. 4 in which processing identical to that in the flowchart presented in FIG. 3, in reference to which the first embodiment has been described, is executed. A repeated explanation of the processing executed in the steps assigned with the same step numbers is not provided.

Upon deciding in step S40 that the downloaded telematics information is still valid, the control unit 10 proceeds to step S43. In step S43, the control unit 10 identifies the road on which the subject vehicle is currently traveling (traveling road). In the embodiment, the road on which the subject vehicle is traveling is identified based upon the current position of the subject vehicle, calculated as explained earlier based upon the angular speed detected by the vibration gyro 11, the vehicle speed detected via the vehicle speed sensor 12 and GPS signals received at the GPS reception unit 14, and the map data recorded in the HDD 13.

In step S44, the control unit 10 detects the actual traveling speed at which the subject vehicle is traveling. In this step, the vehicle speed detected via the vehicle speed sensor 12 is detected as the actual traveling speed of the subject vehicle.

In step S45, the control unit 10 individually calculates estimated subject vehicle traveling speeds on the traveling road identified in step S43, one based upon the traffic information received at the traffic information reception unit 15 and another based upon the telematics information downloaded in step S20. In this step, the congestion information and the traffic control information for the traveling road around the subject vehicle position are extracted both from the traffic information and the telematics information, and, based upon the different sets of information, speeds at which the subject vehicle would be expected to travel on the road along the flows of traffic are calculated as the estimated traveling speeds. It is to be noted that this processing may be executed by referencing speed limit information or the like recorded in the map data as well. Through the processing, a traffic information-based estimated traveling speed and a telematics information-based estimated traveling speed are individually calculated in correspondence to the road on which the subject vehicle is currently traveling.

In step S46, the control unit 10 makes a decision as to which of the estimated traveling speeds calculated in step S45, i.e., the estimated traveling speed calculated based upon the traffic information and the estimated traveling speed calculated based upon the telematics information, assumes a smaller difference relative to the actual traveling speed detected in step S44. If it is decided that the difference between the estimated traveling speed calculated based upon the traffic information and the actual traveling speed is smaller, the operation proceeds to step S41. In this case, the control unit 10 executes the processing in step S41 in much the same way as in the first embodiment, and if an affirmative decision is made in step S41, it further executes the processing in step S42. Subsequently, it selects the traffic information received at the traffic information reception unit 15 as described earlier in step S60. If, on the other hand, it is decided that the difference between the estimated traveling speed calculated based upon the telematics information and the actual traveling speed is smaller, the operation proceeds to step S70. In this case, the control unit 10 selects the telematics information downloaded in step S20 as explained earlier in step S70.

In addition to the advantages of the first embodiment, the following advantage is achieved through the second embodiment described above.

(1) If it is decided in step S40 that the telematics information is still valid, the control unit 10 identifies the road on which the subject vehicle is currently traveling (step S43) and detects the actual speed at which the subject vehicle is traveling (step S44). Then, based upon both the traffic information and the telematics information having been obtained, estimated traveling speeds at which the subject vehicle would be expected to travel on the road identified in step S43 are individually calculated (step S45), and a decision is made as to which estimated traveling speed indicates a smaller difference relative to the actual traveling speed (step S46). According to the decision-making results, either the traffic information or the telematics information, based upon which the estimated traveling speed with a smaller difference relative to the actual traveling speed has been calculated, is selected in step S60 or step S70. Through these measures, either the traffic information or the telematics information, whichever is optimal, can be selected in correspondence to the actual vehicle traveling environment.

Third Embodiment

The third embodiment of the present invention is described next. In the embodiment, if the contents of traffic information and the contents of telematics information obtained at the navigation apparatus are different, either the traffic information or the telematics information is selected through a method distinguishable from those adopted in the first and second embodiments described earlier. It is to be noted that since the configuration of the information distribution system and the structure of the navigation apparatus achieved in the embodiment are identical to those in FIGS. 1 and 2 in reference to which the first embodiment has been described, a repeated explanation thereof is omitted, as in the description of the second embodiment.

Figure 5:
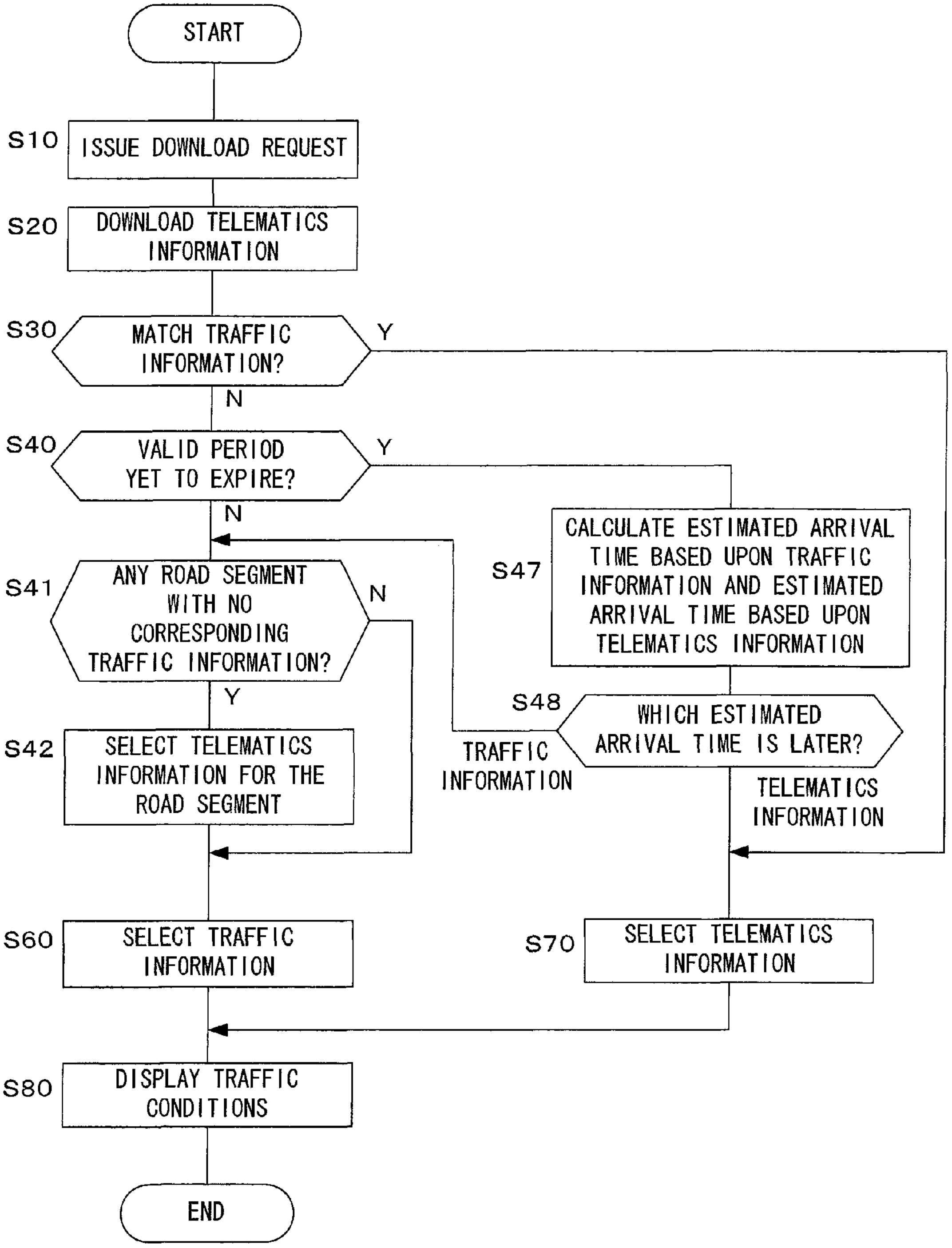
FIG. 5 presents a flowchart of the processing executed in the navigation apparatus in a third embodiment of the present invention.

The processing executed in the navigation apparatus 1 when downloading telematics information provided by the distribution server 5 in the embodiment is described in reference to the flowchart presented in FIG. 5. It is to be noted that the same step numbers are assigned to steps in the flowchart in FIG. 5 in which processing identical to that in the flowcharts presented in FIGS. 3 and 4, in reference to which the first and second embodiments have been described, is executed. A repeated explanation of the processing executed in the steps assigned with the same step numbers is not provided.

Upon deciding in step S40 that the downloaded telematics information is still valid, the control unit 10 proceeds to step S47. In step S47, the control unit 10 calculates estimated arrival times at which the subject vehicle would be expected to arrive at a destination having been set in advance, based upon the traffic information received at the traffic information reception unit 15 and the telematics information downloaded in step S20. In this step, the congestion information and the traffic control information for the recommended route extending from the current subject vehicle position to the destination are extracted both from the traffic information and the telematics information and the estimated arrival times at which the subject vehicle would be expected to arrive at the destination are calculated individually based upon the extracted information. The estimated arrival times may also be calculated by referencing speed limit information and the like recorded in the map data. A traffic information-based estimated arrival time and a telematics information-based estimated arrival time, at which the subject vehicle would be expected to arrive at the destination, are thus separately calculated. It is to be noted that if no destination has been set, a given geographical point present ahead along the subject vehicle advancing direction may be automatically designated as a destination and a recommended route to this destination may be automatically searched.

In step S48, the control unit 10 makes a decision as to which of the estimated arrival times calculated in step S47, i.e., the estimated arrival time calculated based upon the traffic information and the estimated arrival time calculated based upon the telematics information, is later. If the results of the decision-making indicate that the estimated arrival time calculated based upon the traffic information is later, the operation proceeds to step S41. In this case, the control unit 10 executes the processing in step S41 in much the same way as in the first embodiment, and if an affirmative decision is made in step S41, it further executes the processing in step S42. Subsequently, it selects the traffic information received at the traffic information reception unit 15 as described earlier in step S60. If, on the other hand, the estimated arrival time calculated based upon the telematics information is later, the operation proceeds to step S70. In this case, the control unit 10 selects the telematics information downloaded in step S20 as explained earlier in step S70.

In addition to the advantages of the first embodiment, the following advantage is achieved through the third embodiment described above.

(1) If it is decided in step S40 that the telematics information is still valid, the control unit 10 individually calculates estimated arrival times at which the subject vehicle would be expected to arrive at a preset destination (step S47) based upon the traffic information and the telematics information having been obtained and makes a decision as to which estimated arrival time is later (step S48). According to the decision-making results, either the traffic information or the telematics information, based upon which the later estimated destination arrival time has been calculated, is selected in step S60 or step S70. Through these measures, either the traffic information or the telematics information, whichever will prove more reassuring to the user, can be selected. Namely, by selecting the information corresponding to the later arrival time, a greater margin for a delay in the arrival that may occur while the vehicle travels, is assured, so as to minimize any psychologically adverse effect on the user.

Fourth Embodiment

The fourth embodiment of the present invention is now described. In the embodiment, if the contents of traffic information and the contents of telematics information obtained at the navigation apparatus are different, either the traffic information or the telematics information is selected through a method distinguishable from those adopted in the first through third embodiments described earlier. It is to be noted that since the configuration of the information distribution system and the structure of the navigation apparatus achieved in the embodiment are identical to those in FIGS. 1 and 2 in reference to which the first embodiment has been described, a repeated explanation thereof is omitted, as in the description or the second and third embodiments.

Figure 6:
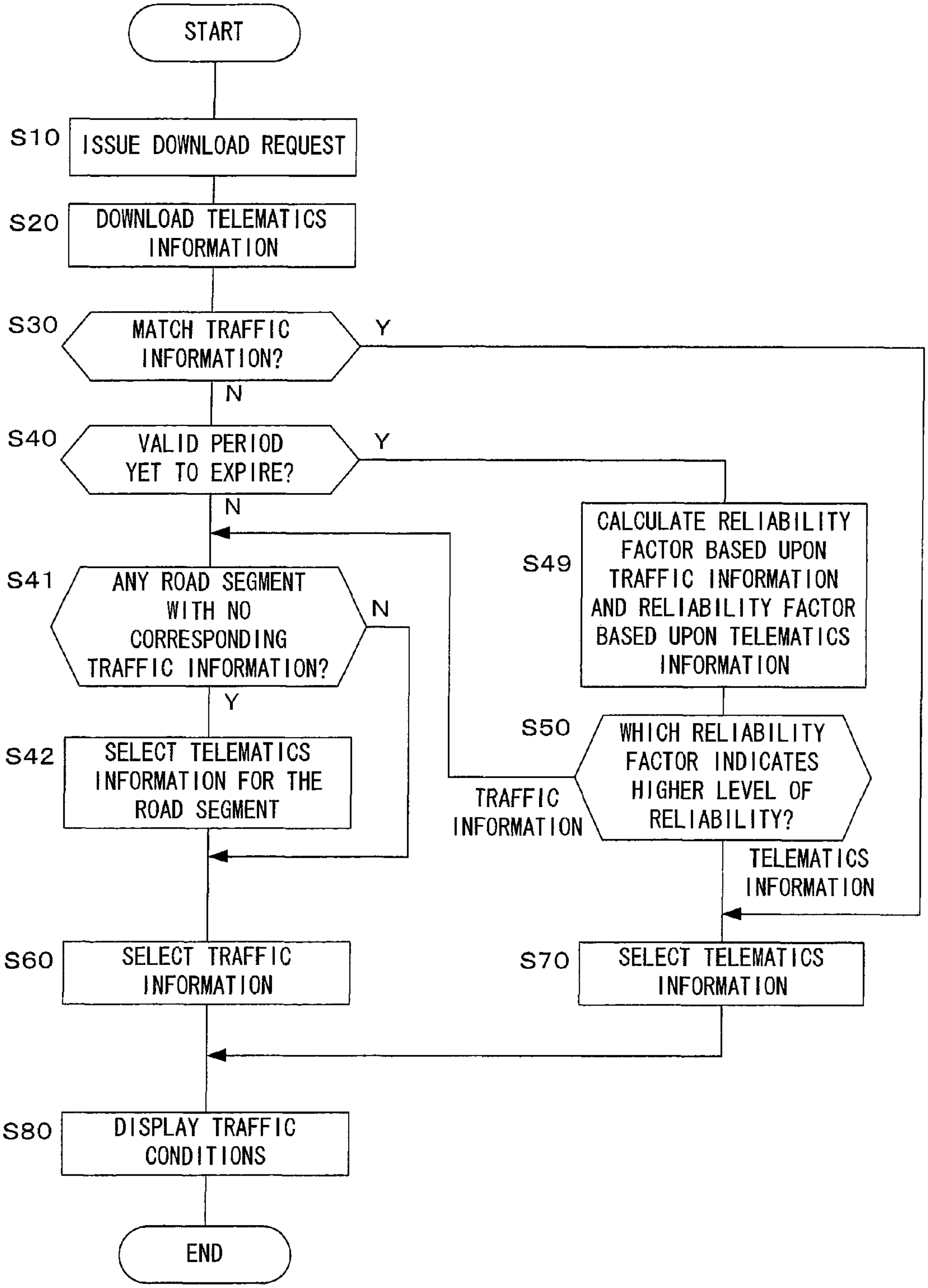
FIG. 6 presents a flowchart of the processing executed in the navigation apparatus in a fourth embodiment of the present invention.

The processing executed in the navigation apparatus 1 when downloading telematics information provided by the distribution server 5 in the embodiment is described in reference to the flowchart presented in FIG. 6. It is to be noted that the same step numbers are assigned to steps in the flowchart in FIG. 6 in which processing identical to that in the flowcharts presented in FIGS. 3 through 5, in reference to which the first through third embodiments have been described, is executed. A repeated explanation of the processing executed in the steps assigned with the same step numbers is not provided.

Upon deciding in step S40 that the downloaded telematics information is still valid, the control unit 10 proceeds to step S49. In step S49, the control unit 10 individually calculates reliability levels of the traffic information received at the traffic information reception unit 15 and the telematics information downloaded in step S20. The reliability levels each change in correspondence to the length of time having elapsed between the time at which the corresponding information was collected either at the traffic information distribution center or at the distribution server 5 and the current time. It is to be noted that the traffic information and the telematics information each include collection time information so as to allow the length of time having elapsed since the collection time to be determined when calculating the corresponding reliability level in step S49.

In step S49, a reliability factor $R_1$ ($t_1$) of the traffic information and a reliability factor $R_2$ ($t_2$) of the telematics information are respectively calculated as expressed in, for instance, (1) and (2) below. It is to be noted that $t_1$ and $t_2$ are variables respectively representing the lengths of time having elapsed between the traffic information collection time and the current time and between the telematics information collection time and the current time.

$$R_1(t_1)=100(1-t_1/d_1) \tag{1}$$

$$R_2(t_2)=100(1-t_2/d_2) \tag{2}$$

$d_1$ and $d_2$ in expressions (1) and (2) are constants respectively equivalent to the values assumed for the lengths of elapsed time $t_1$ and $t_2$ when the reliability factors $R_1$ ($t_1$) and $R_2$ ($t_2$) are at 0. In addition, $1/d_1$ and $1/d_2$, i.e. the reciprocals of $d_1$ and $d_2$, respectively represent decreasing rates at which the reliability factors $R_1$ ($t_1$) and $R_2$ ($t_2$) decrease as the lengths of elapsed time $t_1$ and $t_2$ increase. It is desirable that $d_1$ and $d_2$ take on values satisfying a relationship expressed as $d_1<d_2$, i.e., $1/d_1>1/d_2$. By satisfying such a relationship, it is ensured that the reliability factor $R_1$ ($t_1$) of the traffic information with lower accuracy than the telematics information decreases faster as the time elapses, compared to the reliability factor $R_2$ ($t_2$) of the telematics information. For instance, the values of $d_1$ and $d_2$ may be set so that $d_2=2d_1$, i.e., $1/d_1=2\cdot(1/d_2)$, is true, and with $d_1$ and $d_2$ assuming such values, the reliability factor $R_1$ ($t_1$) of the traffic information will be lowered twice as fast as the reliability factor $R_2$ ($t_2$) of the telematics information.

In step S50, the control unit 10 makes a decision as to which of the reliability factors calculated in step S49, i.e., the reliability factor of the traffic information and the reliability factor of the telematics information, indicates a higher level of reliability. If the reliability factor of the traffic information is determined to indicate a higher level of reliability, the operation proceeds to step S41. In this case, the control unit 10 executes the processing in step S41 in much the same way as in the first embodiment, and if an affirmative decision is made in step S41, it further executes the processing in step S42. Subsequently, it selects the traffic information received at the traffic information reception unit 15 as described earlier in step S60. If, on the other hand, the reliability factor of the telematics information is determined to indicate a higher level of reliability, the operation proceeds to step S70. In this case, the control unit 10 selects the telematics information downloaded in step S20 as explained earlier in step S70.

In addition to the advantages of the first embodiment, the following advantages are achieved through the fourth embodiment described above.

(1) If it is decided in step S40 that the telematics information is still valid, the control unit 10 individually calculates (step S49) reliability factors for the traffic information and the telematics information having been obtained, in correspondence to the lengths of time having elapsed since the collection time points, and then makes a decision as to which reliability factor indicates a higher level of reliability (step S50). Based upon the decision-making results, either the traffic information or the telematics information, whichever assures the higher level of reliability, is selected in step S60 or step S70. Through these measures, either the traffic information or the telematics information can be correctly selected based upon the levels of their reliability.

(2) It is desirable that the control unit 10, calculating the reliability factors in step S49, set the rate of decrease for the reliability factor calculated in correspondence to the traffic information, at which the traffic information reliability factor decreases as time elapses, higher than the decreasing rate at which the reliability factor calculated for the telematics information decreases as time elapses. Through these measures, it is ensured that the reliability factor of the traffic information with lower accuracy than the telematics information decreases faster than the reliability of the telematics information. Consequently, the reliability factors can be calculated accurately in correspondence to the varying levels of accuracy of the two types of information.

Fifth Embodiment

The fifth embodiment of the present invention is described next. In this embodiment, either of the traffic information or the telematics information is selected through a method similar to that described in reference to the second embodiment, regardless of whether or not the valid period of the telematics information is yet to expire.

Figure 7:
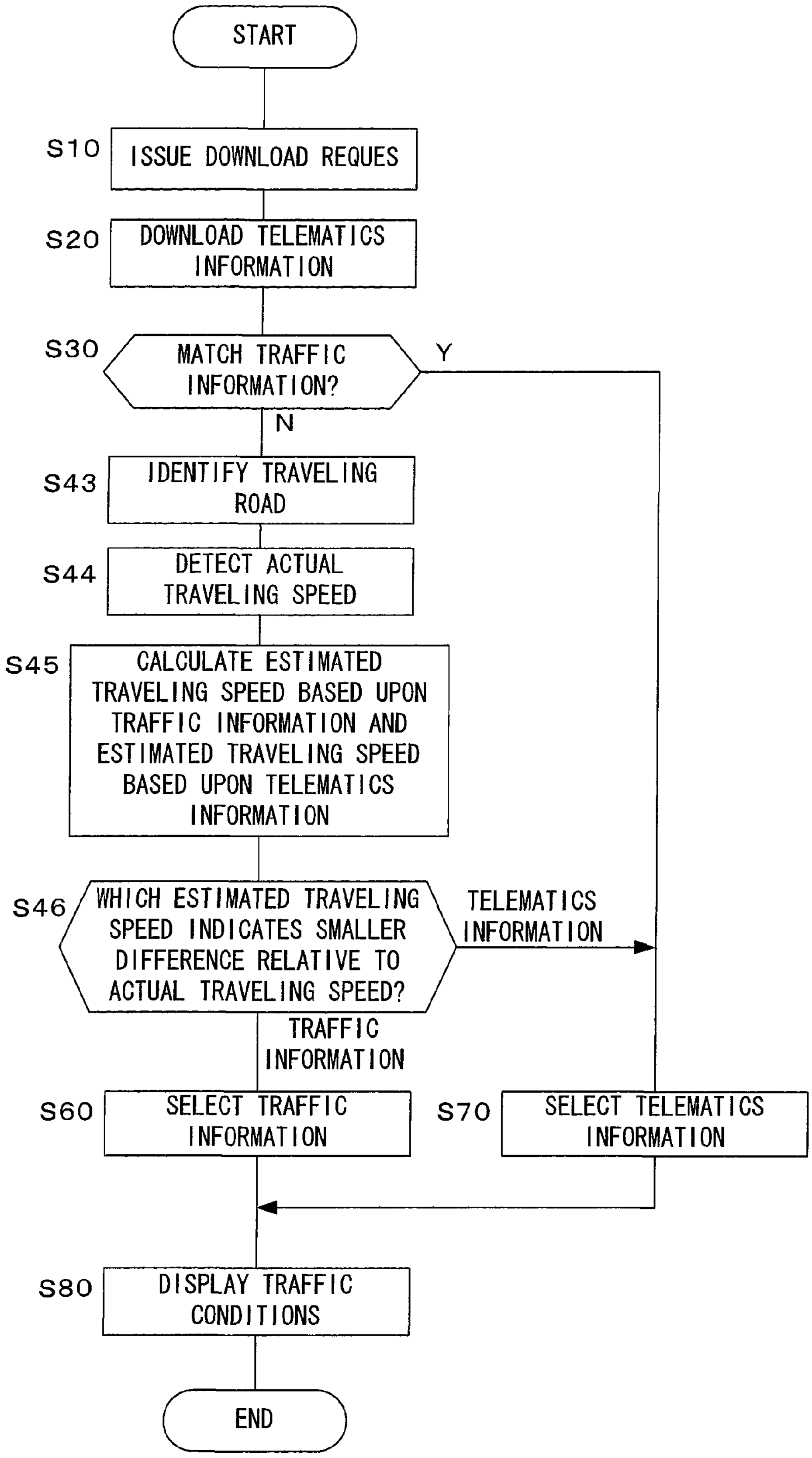
FIG. 7 presents a flowchart of the processing executed in the navigation apparatus in a fifth embodiment of the present invention.

The processing executed in the navigation apparatus 1 when downloading telematics information provided by the distribution server 5 in the embodiment is shown in the flowchart presented in FIG. 7. This flowchart is identical to the flowchart presented in FIG. 4 except for that it does not include the processing in steps S40 through S42 and that upon making a negative decision in step S30, the operation proceeds to step S43. Apart from these differences, the processing executed in the fifth embodiment is identical to that executed in the second embodiment.

Through the fifth embodiment described above, advantages similar to those of the second embodiment are achieved, regardless of whether or not the valid period for the telematics information is yet to expire.

Sixth Embodiment

The sixth embodiment of the present invention is now described. In this embodiment, either of the traffic information or the telematics information is selected through a method similar to that described in reference to the third embodiment, regardless of whether or not the valid period of the telematics information is yet to expire.

Figure 8:
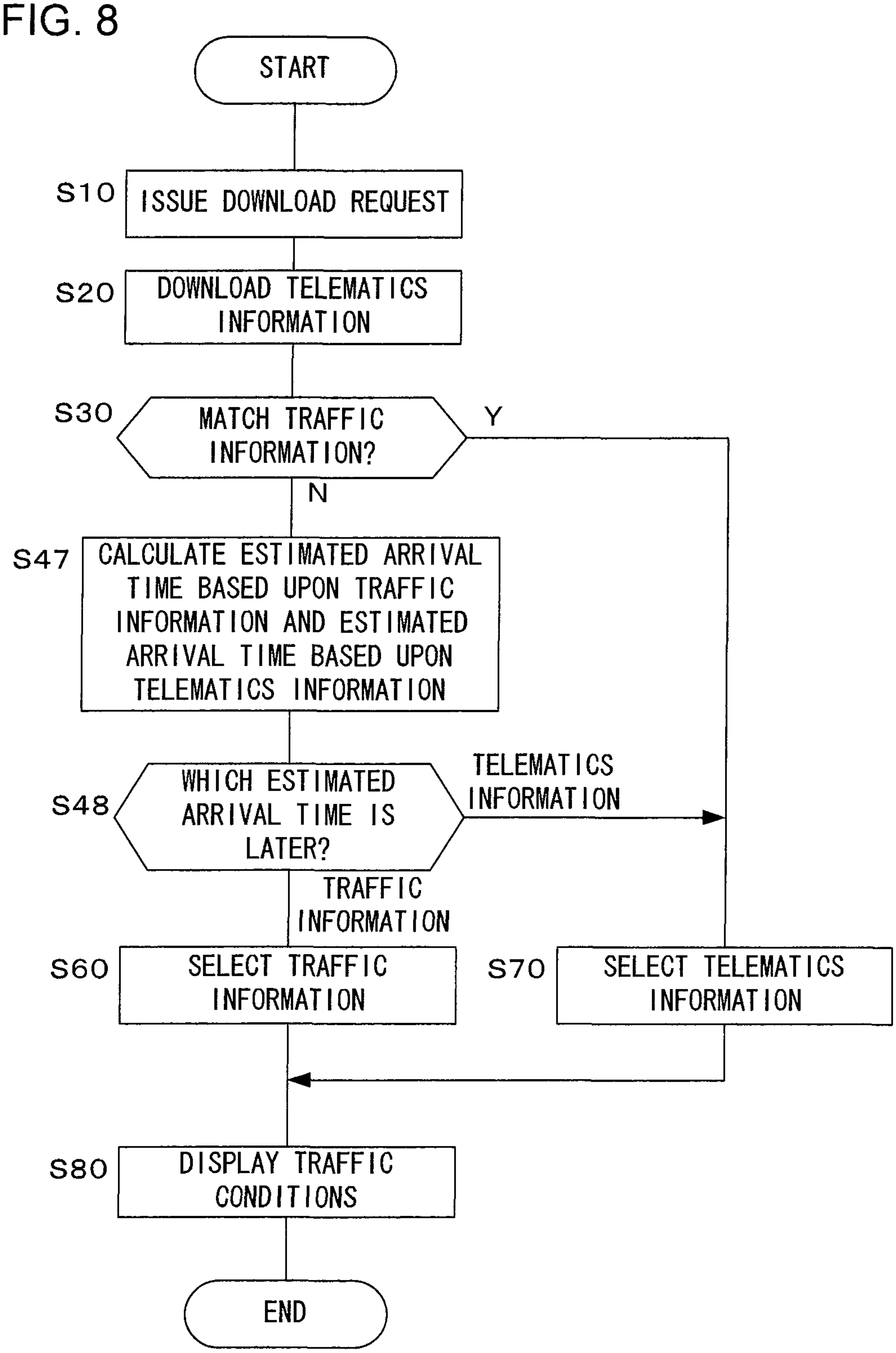
FIG. 8 presents a flowchart of the processing executed in the navigation apparatus in a sixth embodiment of the present invention.

The processing executed in the navigation apparatus 1 when downloading telematics information provided by the distribution server 5 in the embodiment is shown in the flowchart presented in FIG. 8. This flowchart is identical to the flowchart presented in FIG. 5 except for that it does not include the processing in steps S40 through S42 and that upon making a negative decision in step S30, the operation proceeds to step S47. Apart from these differences, the processing executed in the sixth embodiment is identical to that executed in the third embodiment.

Through the sixth embodiment described above, advantages similar to those of the third embodiment are achieved, regardless of whether or not the valid period for the telematics information is yet to expire.

Seventh Embodiment

The seventh embodiment of the present invention is described next. In this embodiment, either of the traffic information or the telematics information is selected through a method similar to that described in reference to the fourth embodiment, regardless of whether or not the valid period of the telematics information is yet to expire.

Figure 9:
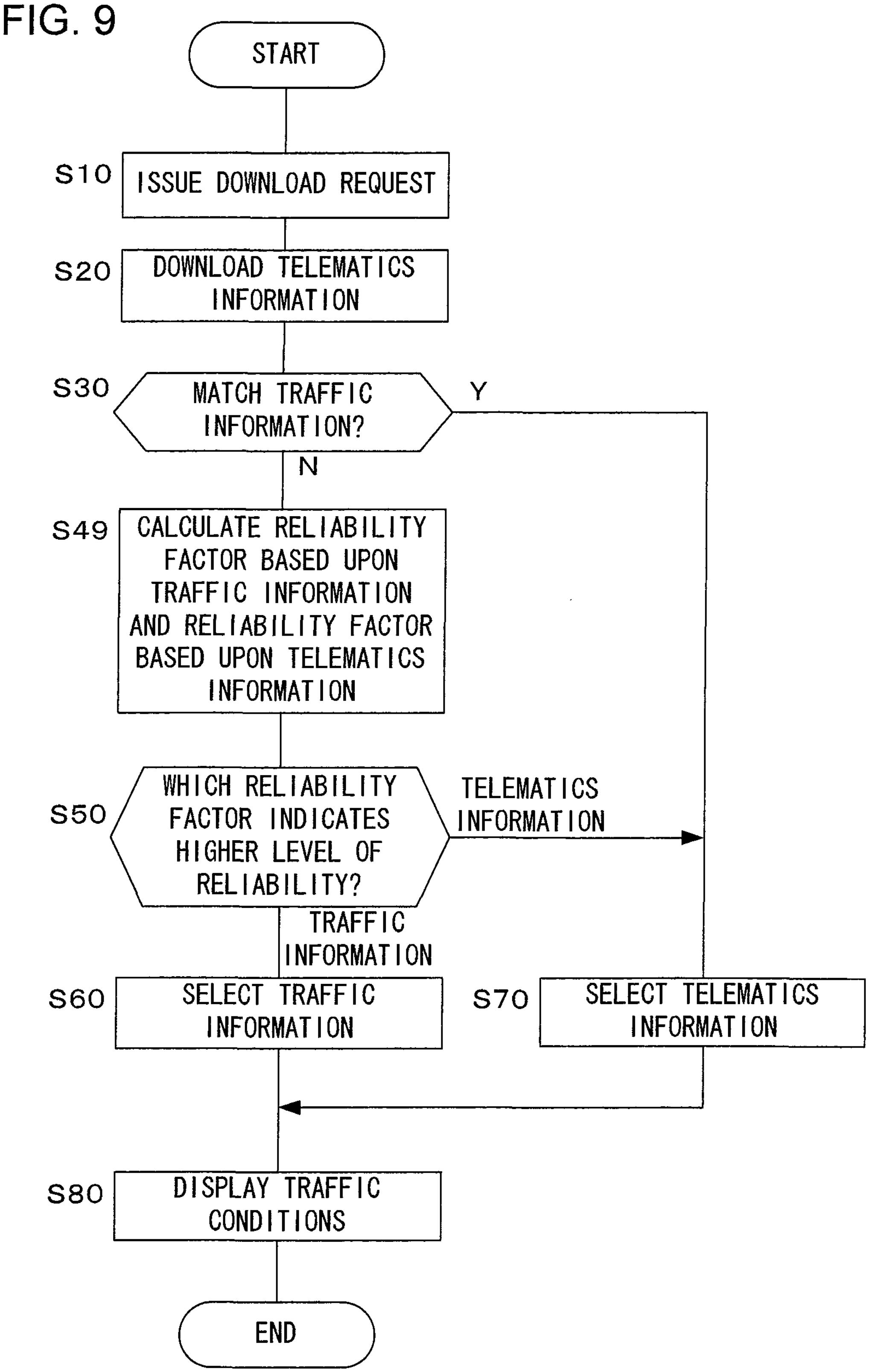
FIG. 9 presents a flowchart of the processing executed in the navigation apparatus in a seventh embodiment of the present invention.

The processing executed in the navigation apparatus 1 when downloading telematics information provided by the distribution server 5 in the embodiment is shown in the flowchart presented in FIG. 9. This flowchart is identical to the flowchart presented in FIG. 6 except for that it does not include the processing in steps S40 through S42 and that upon making a negative decision in step S30, the operation proceeds to step S49. Apart from these differences, the processing executed in the seventh embodiment is identical to that executed in the fourth embodiment.

Through the seventh embodiment described above, advantages similar to those of the fourth embodiment are achieved, regardless of whether or not the valid period for the telematics information is yet to expire.

It is to be noted that while an explanation is given above in reference to the embodiments on an example in which telematics information stored and held in the distribution server 5 is distributed to the navigation apparatus 1 installed in the vehicle 100 via the mobile communication network 4 and the communication terminal 2, the present invention is not limited to this example. The telematics information can be distributed to any of various types of on-vehicle information terminals such as a personal computer, a PDA (personal digital assistant) and a portable telephone, other than the navigation apparatus. In addition, the present invention may be adopted in conjunction with an on-vehicle information terminal that includes a built-in communication terminal. Furthermore, information other than the congestion information may be distributed as telematics information. For instance, information on sightseeing locations or various types of facilities may be distributed as telematics information.

In addition, in the fifth through seventh embodiments among the embodiments described above, the processing in steps S41 and S42 may be executed before selecting the traffic information in step S60, as in the second through fourth embodiment respectively. If there is any road segment, for which telematics information is provided but no traffic information is available, the telematics information will be selected for the particular road segment and the traffic information will be selected for the remaining road segments through the alternative processing. As a result, traffic conditions can be indicated by supplementing information for any road segment for which no traffic information is provided, with telematics information.

The embodiments described above and variations thereof are simply provided as examples and components other than those in the embodiments may be used as long as the features characterizing the present invention are not compromised.

What is claimed is:

1. An on-vehicle information terminal, comprising:
a traffic information obtaining unit that obtains traffic information through wireless communication;
a telematics information obtaining unit that obtains telematics information provided from a distribution server via a mobile communication network;
a control unit that selects either the traffic information or the telematics information for each road segment, when contents of the traffic information and contents of the telematics information are different; and
a traffic condition indicating unit that indicates road traffic conditions based upon either the traffic information or the telematics information having been selected by the control unit.

2. An on-vehicle information terminal according to claim 1, further comprising:
a decision-making unit that makes a decision, based upon collection time information included in the telematics information, as to whether or not a predetermined valid period for the telematics information is yet to expire, wherein:
the control unit selects either the traffic information or the telematics information based upon decision-making results by the decision-making unit.

3. An on-vehicle information terminal according to claim 2, wherein:
if the decision-making unit decides that the valid period for the telematics information has expired, the control unit selects the telematics information for a road segment for which corresponding telematics information is provided and no corresponding traffic information is provided, and selects the traffic information for other road segments.

4. An on-vehicle information terminal according to claim 2, further comprising:
a traveling road identifying unit that identifies a traveling road on which a subject vehicle is traveling;
a speed detection unit that detects an actual traveling speed at which the subject vehicle is traveling; and
a speed calculation unit that individually calculates, based upon the traffic information and the telematics information, estimated traveling speeds at which the subject vehicle would be expected to travel on the traveling road, wherein:
if the decision-making unit decides that the valid period for the telematics information is yet to expire, the control unit selects either the traffic information or the telematics information in correspondence to which an estimated traveling speed with a smaller difference relative to the actual traveling speed has been calculated.

5. An on-vehicle information terminal according to claim 2, further comprising:
an estimated arrival time calculation unit that individually calculates, based upon the traffic information and the telematics information, estimated arrival times at a destination set in advance, wherein:
if the decision-making unit decides that the valid period for the telematics information is yet to expire, the control unit selects either the traffic information or the telematics information in correspondence to which a later estimated arrival time has been calculated.

6. An on-vehicle information terminal according to claim 2, further comprising:
a reliability factor calculation unit that individually calculates reliability factors for the traffic information and the telematics information, in correspondence to lengths of time having elapsed since collection times thereof, wherein:
if the decision-making unit decides that the valid period for the telematics information is yet to expire, the control unit selects either the traffic information or the telematics information with a reliability factor thereof indicating a higher level of reliability.

7. An on-vehicle information terminal according to claim 6, wherein:
the reliability factor calculation unit sets a decreasing rate, at which the reliability factor calculated for the traffic information decreases as time elapses, higher than a decreasing rate at which the reliability factor calculated for the telematics information decreases as time elapses.

8. An on-vehicle information terminal according to claim 1, further comprising:
a traveling road identifying unit that identifies a traveling road on which a subject vehicle is traveling;
a speed detection unit that detects an actual traveling speed at which the subject vehicle is traveling; and
a speed calculation unit that individually calculates, based upon the traffic information and the telematics information, estimated traveling speeds at which the subject vehicle would be expected to travel on the traveling road, wherein:
the control unit selects either the traffic information or the telematics information in correspondence to which an estimated traveling speed with a smaller difference relative to the actual traveling speed has been calculated.

9. An on-vehicle information terminal according to claim 1, further comprising:
an estimated arrival time calculation unit that individually calculates, based upon the traffic information and the telematics information, estimated arrival times at a destination set in advance, wherein:
the control unit selects either the traffic information or the telematics information, in correspondence to which a later estimated arrival time has been calculated.

10. An on-vehicle information terminal according to claim 1, further comprising:

a reliability factor calculation unit that individually calculates reliability factors for the traffic information and the telematics information, in correspondence to lengths of time having elapsed since collection times thereof, wherein:

the control unit selects either the traffic information or the telematics information with a reliability factor thereof indicating a higher level of reliability.

11. An on-vehicle information terminal according to claim 10, wherein:

the reliability factor calculation unit sets a decreasing rate, at which the reliability factor calculated for the traffic information decreases as time elapses, higher than a decreasing rate at which the reliability factor calculated for the telematics information decreases as time elapses.

12. An information distribution system, comprising:

an on-vehicle information terminal according to claim 1; and a distribution server that provides the telematics information to the on-vehicle information terminal via the mobile communication network.

* * * * *